US007318171B2

(12) United States Patent
Rothman et al.

(10) Patent No.: US 7,318,171 B2
(45) Date of Patent: Jan. 8, 2008

(54) POLICY-BASED RESPONSE TO SYSTEM ERRORS OCCURRING DURING OS RUNTIME

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 556 days.

(21) Appl. No.: 10/387,750

(22) Filed: Mar. 12, 2003

(65) Prior Publication Data

US 2004/0181708 A1 Sep. 16, 2004

(51) Int. Cl.
*G06F 11/00* (2006.01)
(52) U.S. Cl. .......................... 714/25; 714/37; 712/229
(58) Field of Classification Search .................. None
See application file for complete search history.

(56) References Cited

U.S. PATENT DOCUMENTS

| 5,239,547 | A | | 8/1993 | Tomiyama et al. | |
|---|---|---|---|---|---|
| 5,255,379 | A | * | 10/1993 | Melo | 711/202 |
| 5,317,752 | A | | 5/1994 | Jewett et al. | |
| 5,357,628 | A | * | 10/1994 | Yuen | 714/34 |
| 5,974,573 | A | | 10/1999 | Martin | |
| 5,978,912 | A | * | 11/1999 | Rakavy et al. | 713/2 |
| 6,000,043 | A | | 12/1999 | Abramson | |
| 6,012,154 | A | * | 1/2000 | Poisner | 714/55 |
| 6,093,213 | A | * | 7/2000 | Favor et al. | 703/27 |
| 6,148,441 | A | | 11/2000 | Woodward | |
| 6,173,417 | B1 | * | 1/2001 | Merrill | 714/15 |
| 6,205,547 | B1 | * | 3/2001 | Davis | 713/1 |
| 6,324,644 | B1 | * | 11/2001 | Rakavy et al. | 713/1 |
| 6,370,586 | B2 | * | 4/2002 | Davis et al. | 709/244 |
| 2003/0237007 | A1 | * | 12/2003 | Ramirez | 713/300 |

FOREIGN PATENT DOCUMENTS

EP 0840226 A1 5/1998
WO PCT/US2004/003151 9/2004

OTHER PUBLICATIONS

Intel Corporation. "IA-32 Intel Architecture Software Developer's Manual vol. 3: System Programming Guide—Chapter 12. System Management." 2001.*
Russinovich, Mark et al., "Application Transparent Fault Management in Fault Tolerant Mach," *IEEE*, Jun. 22, 1993, pp. 10-19.

* cited by examiner

*Primary Examiner*—Robert Beausoliel
*Assistant Examiner*—Philip Guyton
(74) *Attorney, Agent, or Firm*—Blakely, Sokoloff, Taylor & Zafman LLP (57) ABSTRACT

A method and apparatus for detecting and responding to a system error. To detect the system error, a protected mode of operation is activated in a processing system. While the protected mode of operation is activated, the processing system is queried to determine whether a system error has occurred. If the system error is determined to have occurred, the system error is responded to based on a fault tolerance policy.

26 Claims, 7 Drawing Sheets

POLICY-BASED RESPONSE TO SYSTEM ERRORS OCCURRING DURING OS RUNTIME

TECHNICAL FIELD

This disclosure relates generally to system fault recovery, and in particular but not exclusively, relates to a policy-based response to system errors occurring during operating system runtime.

BACKGROUND INFORMATION

Computers have become a ubiquitous tool in a modern office environment. However, users of these computers often do not have the technical knowledge and/or training necessary to remedy the myriad of system errors or malfunctions that can present themselves on a daily basis. Often, when a computer experiences a malfunction and the user is unable to resolve it, a call is made to an information technology ("IT") technician for help, requiring a human-to-human interchange. In some instances, the IT technician is able to direct the user over a telephone how to remedy the malfunction. Yet, in many cases the IT technician must physically go to the malfunctioning computer to diagnose the problem and remedy the malfunction. A remedy may be as simple as changing software settings in an application running on the computer to installing a new software or even a new firmware image on the computer.

In large office environments, office computers are often interconnected over a local area network ("LAN") to a server. These office computers are referred to as client computers. The LAN and the client computers are often maintained by an in-house IT technician or IT group. It is the job of the IT group to diagnose and remedy malfunctioning client computers as quickly as possible. Client computer "downtime" equates to wasted user productivity. However, responding to the myriad of daily malfunctions in a large office environment can be a large task requiring many IT technicians. Using live IT technicians is inherently expensive and they are frequently in short supply, which all too often results in undue loss of user productivity.

To avoid such expenses, diagnostic facilities have been developed that enable an IT technician to obtain information about a malfunctioning computer, without requiring a physical presence at the malfunctioning computer. In the past, equipment manufacturers have employed network protocols such as Simple Network Management Protocol ("SNMP") to perform remote system diagnostics. An IT technician can utilize SNMP-based software tools to query the status of the malfunctioning computer or to invoke a built-in diagnostic functionality of the client computer and monitor the test results remotely. However, this approach still requires an IT technician to over see the remedial process from a server computer. Additionally, if an operating system of the client computer has malfunctioned or "crashed" the SNMP-based software may not be capable of responding to status queries by the IT technician. Thus, in the case of a system crash, it may still be necessary for the IT technician to address the problem in person at the client computer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for implementing a policy-based response to system errors occurring during operating system ("OS") runtime are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment of the present invention, a processing system is capable of diagnosing and responding to a system error based on a fault tolerance policy. The processing system is even capable of diagnosing and responding to a system error that results in a system crash, such as when an operating system ("OS") of the processing system hangs or freezes. In one embodiment, a server system is capable of diagnosing and responding to a system error of a client system over a network. These and other embodiments and additional features of the present invention are described in detail below.

Figure 1:
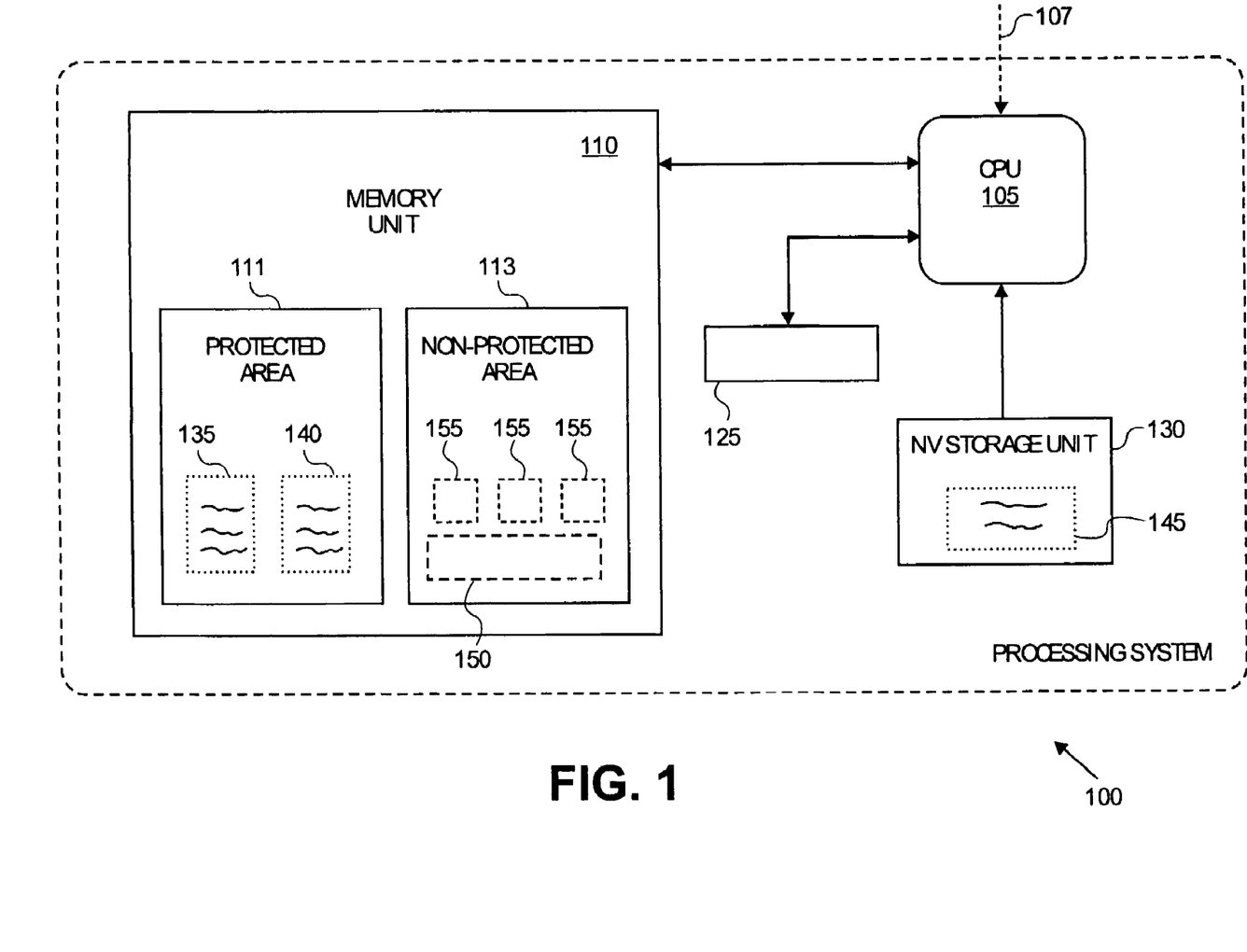
FIG. 1 is a block diagram illustrating a processing system to execute a policy-based response to system errors, in accordance with an embodiment the present invention.

FIG. 1 is a block diagram illustrating a processing system 100 to execute a policy-based response to system errors, according to an embodiment of the present invention. In one embodiment, processing system 100 includes a central processing unit ("CPU") 105, a memory unit 110, a memory location 125, and a nonvolatile ("NV") storage unit 130. In one embodiment, memory unit 110 includes a protected area 111 and a non-protected area 113. In one embodiment, a fault response agent 135 and a fault tolerance policy 140 are stored in protected area 111 of memory unit 110. In one embodiment, a fault response agent 145 is stored in NV storage unit 130. In one embodiment, an OS 150 and software applications 155 are stored and executed in non-protected area 113 of memory unit 110.

The elements of processing system 100 are interconnected as follows. CPU 105 is communicatively coupled to NV storage unit 130 to receive and to execute firmware instructions therefrom. Additionally, CPU 105 is communicatively coupled to memory unit 110 to execute OS 150 and software applications 155. In some cases, the firmware instructions may be transferred by CPU 105 from NV storage unit 130 into memory unit 110, and from there executed by CPU 105.

In one embodiment, CPU 105 is an Intel Architecture based CPU. In other embodiments, CPU 105 is any processor capable of receiving, sending, and executing software instructions. In one embodiment, memory unit 110 is system random access memory ("RAM"). In other embodiments, memory unit 110 is a hard disk, floppy disk, tape drive, non-volatile memory or the like. In one embodiment, NV storage unit 130 is a read only memory device. In other embodiments, NV storage unit 130 is a programmable read only memory device, an erasable programmable read only memory device, an electrically erasable programmable read only memory device, a flash memory device, or the like.

Figure 2:
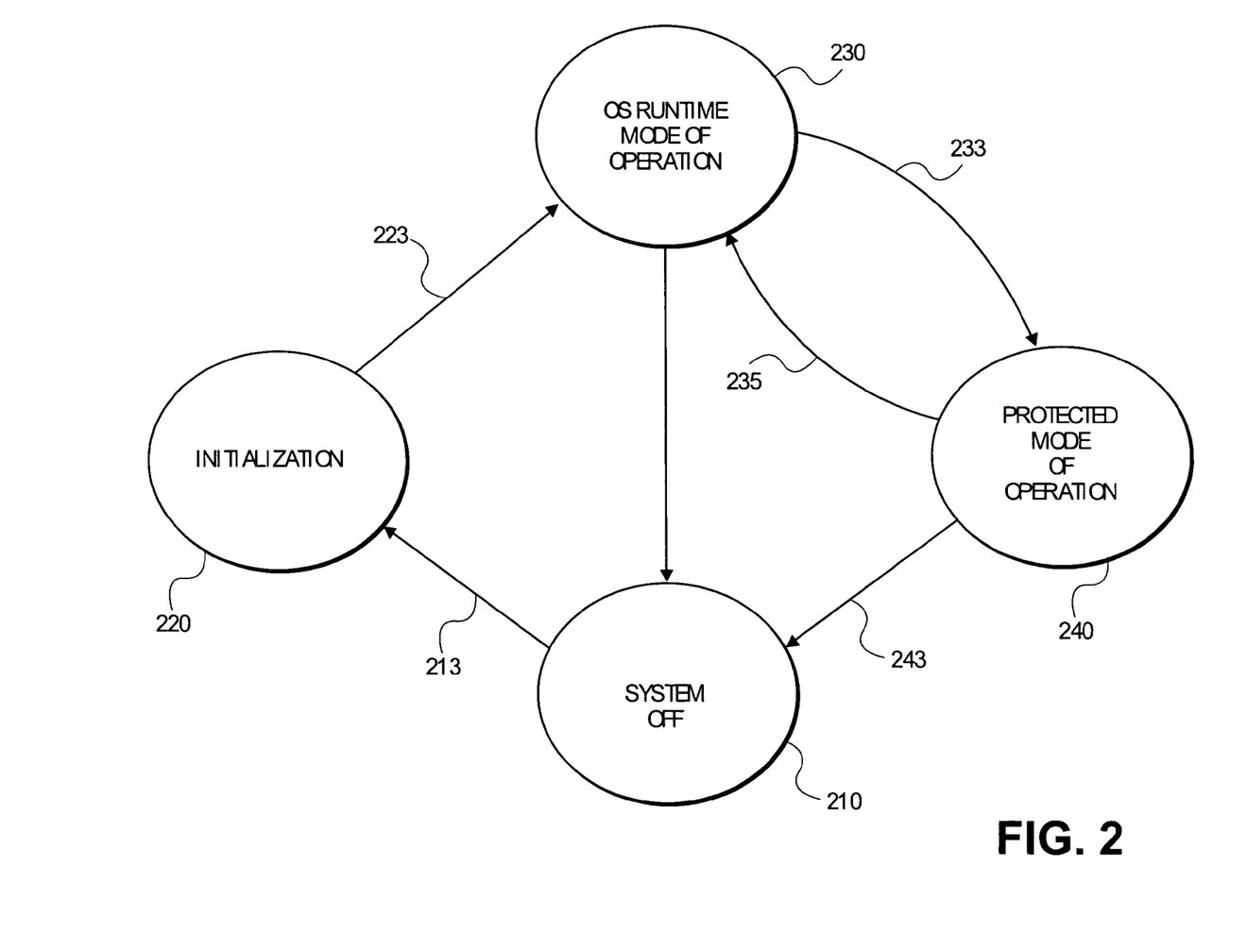
FIG. 2 is a state diagram illustrating states that a processing system cycles through to execute a policy-based response to system errors, in accordance with an embodiment the present invention.

Turning now to FIGS. 1 and 2, one embodiment of processing system 100 cycles through the following states to implement a policy-based response to system errors. In a system off state 210, processing system 100 is powered off. A state transition 213 transitions processing system 100 to initialization state 220 when a power-on signal is received by CPU 105.

In initialization state 220, processing system 105 begins its early initialization. This initialization may include the execution of tasks by CPU 105, such as loading a boot program from NV storage unit 130, executing a power-on self test ("POST"), and searching attached drives for an OS 150 and loading files of OS 150 into non-protected area 113 of memory unit 110. For example, in a Microsoft Windows™ environment, CPU 105 may load a file called IO.SYS into non-protected area 113. In one embodiment, initialization state 220 includes loading fault response agent 145 into protected area 111 of memory unit 110. For purposes of clarity, once fault response agent 145 is loaded from firmware 130 into protected area 111 it will be referred to as fault response agent 135. It should be appreciated that fault response agent 145 may be stored in any non-volatile memory device communicatively coupled to CPU 105, such as a hard disk or the like. If processing system 100 is communicatively coupled to a network, it may also acquire a server address during initialization state 220 via a dynamic host configuration protocol ("DHCP") or other suitable network protocol. Processing system 100 may perform a number of other tasks during initialization state 220, which have been excluded for the sake of clarity.

A state transition 223 occurs when the boot program hands control of processing system 100 to OS 150. State transition 223 transitions processing system 100 from initialization state 220 to an OS runtime mode of operation state 230. In OS runtime mode of operation state 230, OS 150 has control over processing system 100 and CPU 105 may be executing any number of software applications 155 on top of OS 150.

In one embodiment, processing system 100 transitions to a protected mode of operation state 240 via a state transition 233 upon CPU 105 rec interrupt signal 107. While in protected mode of operation state 240, OS runtime is suspended. Operation of processing system 100 during protected mode of operation state 240 is protected from corruption by OS 150 or applications 155 that execute during OS runtime mode of operation state 230. Thus, CPU 105 is capable of executing software instructions during protected mode of operation state 240, even though OS 150 has crashed and CPU 105 is incapable of useful execution during OS runtime mode of operation state 230.

In one embodiment, protected mode of operation state 240 is a system management mode ("SMM") built into Intel SL Enhanced 486 and Pentium™ CPUs. In this embodiment, SMM is entered when a system management interrupt ("SMI") is received by CPU 105. When an event generates the SMI, CPU 105 responds by saving a substantial part of its current state in a state save map, initializes some registers to provide the SMM execution environment, and then begins execution inside SMM. In this SMM embodiment, protected area 111 of memory unit 110 is referred to as system management random access memory ("SMRAM"). Only applications executed during SMM have access to the SMRAM. Thus, OS 150 and software applications 155 that execute during OS runtime mode of operation state 230 do not have access to the SMRAM. In this manner, SMRAM and applications executed during SMM (e.g., fault response agent 135) are protected from corruption by OS 150 and/or software applications 155. Even if OS 150 has crashed or one of software applications 155 hangs, execution by CPU 105 during SMM is unaffected. Additionally, SMM is transparent to OS 155, and furthermore, OS agnostic. In other words, OS 150 and software applications 155 are unaware of SMM and SMRAM.

Once in protected mode of operation state 240, fault response agent 135 queries processing system 100 to determine if a system error has occurred. If fault response agent 135 detects no system errors, processing system 100 returns to OS runtime mode of operation state 230 along a state transition 235. Once processing system 100 returns to OS runtime mode of operation state 230 along state transition 235, executing by CPU 105 resumes where it left off.

If fault response agent 135 does detect the presence of a system error, fault response agent 135 responds to remedy the system error based upon fault tolerance policy 140. In one embodiment, fault tolerance policy 140 contains a list of policy directives corresponding to system errors. Fault response agent 135 executes these policy directives to respond to the detected system error. Fault tolerance policy 140 is discussed in greater detail below. Based upon the particular policy directive executed by fault response agent 135, processing system 100 will either return to OS runtime mode of operation state 230 along state transition 235 or transition to system off state 210 along a state transition 243. If processing system 100 returns to OS runtime mode of operation state 230, it will again return to protected mode of operation state 240. The frequency with which processing system 100 executes state transition 233 is discussed in greater detail below. If processing system 100 transitions to system off state 210 along state transition 243, processing system 100 will return to OS runtime mode of operation state 230 in a similar manner as discussed above.

Figure 3:
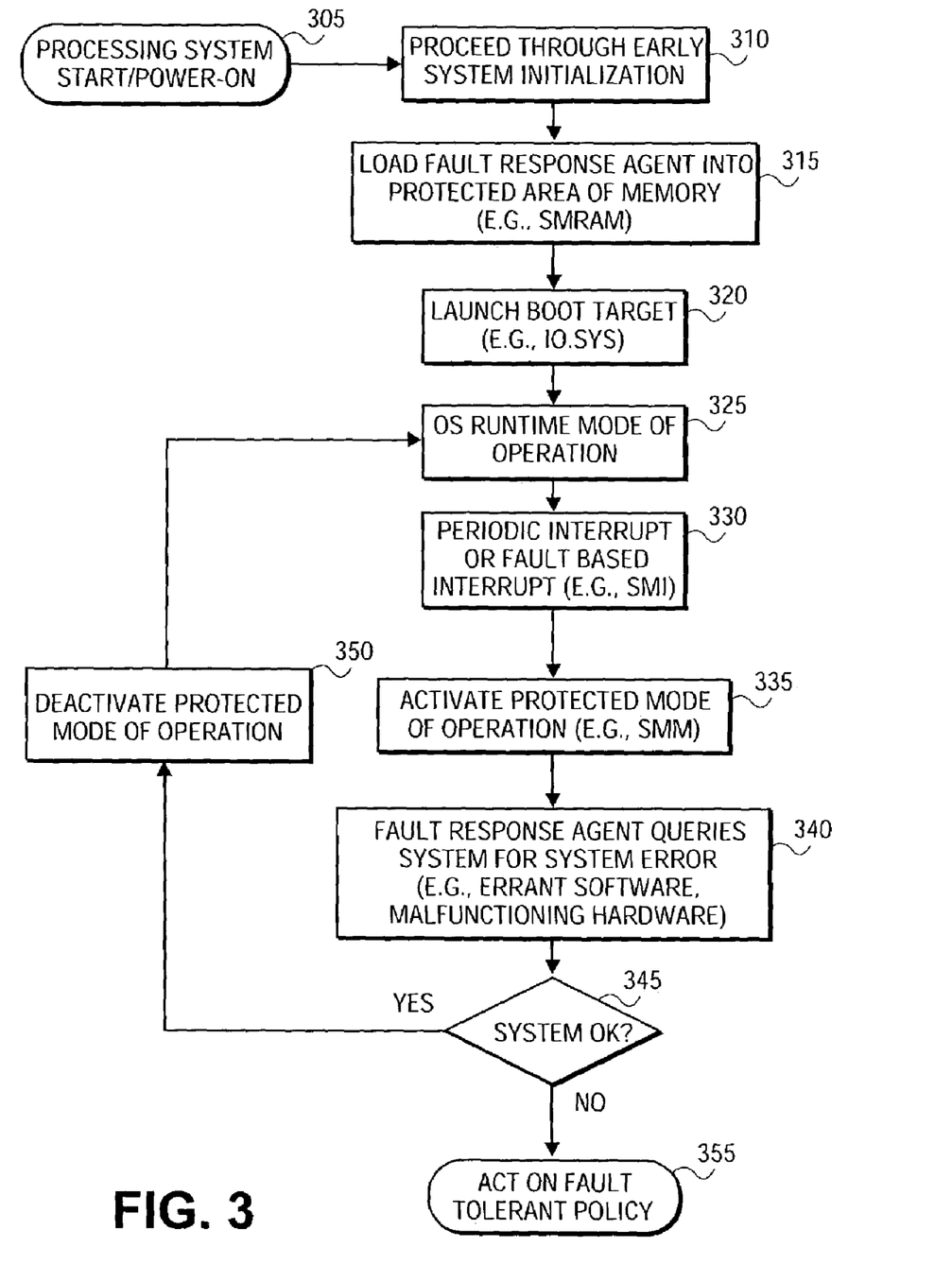
FIG. 3 is a flow diagram illustrating a method to implement a processing system to execute a policy-based response to system errors, in accordance with an embodiment of the present invention.

Turning now to FIGS. 1 and 3, one embodiment of processing system 100 operates as follows to implement a policy-based response to system errors, according to the present invention.

In a process block 305, processing system 100 is powered-on. A powered-on event may be the result of a user of processing system 100 turning processing system 100 on, or it may be the result of a reset of processing system 100. From process block 305, processing system 100 proceeds through early system initialization (process block 310) as described above in connection with initialization state 220. Next, CPU 105 loads fault response agent 145 into protected area 111 of memory unit 110 (process block 315). In a process block 320, CPU 105 launches a boot target (e.g., IO.SYS when operating in the Microsoft Windows™ environment). At this point, processing system 100 continues to a process block 325 where the OS runtime mode of operation is entered.

While in the OS runtime mode of operation, OS 150 controls the operation of CPU 105 and various other elements of processing system 100 not shown. Furthermore, one or more software application 155 may be executing on top of OS 150. The OS runtime mode of operation represents the ordinary operation mode of CPU 105 and processing system 100.

In a process block 330, interrupt signal 107 is received by CPU 105 indicating to CPU 105 to activate the protected mode of operation. In one embodiment, interrupt signal 107 is generated periodically with a set interval (e.g., a heartbeat interrupt). In one embodiment, interrupt signal 107 is triggered responsive to a hardware watchdog timer. A watchdog timer is a clock circuit that keeps counting from a starting number down to zero. If the event the watchdog timer is monitoring occurs before the watchdog timer reaches zero, the watchdog timer resets to the starting number and starts counting down again. If the clock circuit reaches zero, the circuit generates interrupt signal 107. In one embodiment, the watchdog timer monitors memory location 125, which in turn is updated at a set interval by OS 150 or one of software applications 155. Thus, if the one of OS 150 or software applications 155 responsible for updating memory location 125 hangs or otherwise faults (i.e., causes a system error), memory location 125 may not be updated prior to the watchdog timer counting down to zero. In this event, the watchdog timer will generate interrupt signal 107. In one embodiment, interrupt signal 107 is the SMI described above.

Once interrupt signal 107 is generated in process block 330, CPU 105 activates the protected mode of operation (process block 335) and suspends the OS runtime mode of operation. While OS runtime is suspended, fault response agent 135, which was loaded into protected area 111 of memory unit 110 in process block 315, queries various aspects of processing system 100 to determine whether a system fault or system error has occurred (process block 340). In one embodiment, querying processing system 100 includes accessing memory location 125 to determine whether data contained in memory location 125 has evolved over time in a predetermined or expected manner during the OS runtime mode of operation, since the last time fault response agent 135 queried memory location 125. Thus, if OS 150 or one of software applications 155 hangs, it may no longer be capable of updating memory location 125 as expected by fault response agent 135. With successive transitions between the OS runtime mode of operation and the protected mode of operation, fault response agent 135 can compare a current value of the data with a previous value of the data. If the data has not changed in a manner expected, then fault response agent 135 determines that a system error has occurred (decision block 345).

In one embodiment, memory location 125 is a data register accessible by OS 150 and/or software applications 155. In one embodiment, memory location 125 is a memory location or a plurality of memory locations within non-protected area 113 of memory unit 110. Memory location 125 can be any memory address location or locations of any memory device or devices coupled to CPU 105, which evolves in a determinable manner during OS runtime, or remains static in a determinable manner during OS runtime. It should be appreciated that although only one memory location 125 is illustrated in FIG. 1, fault response agent 135 may access any number of memory locations 125 within processing system 100 to gather diagnostic information about the operational health of processing system 100. In one embodiment, each of applications 155 has at least one corresponding memory location 125 that fault response agent 135 can query during the protected mode of operation in process block 340.

In addition to fault response agent 135 having knowledge of how memory location 125 is expected to evolve over time during healthy operation of processing system 100, fault response agent 135 may also have knowledge of other attributes and characteristics of memory location 125. For example, if memory location 125 contains system clock data of processing system 100, fault response agent 135 would possess this information and know that the system clock should be incrementing in a determinable manner. If the system clock data fails to increment an expected amount between successive queries of memory location 125, then fault response agent 135 may query other aspects of processing system 100 to determine that either the system clock application has faulted or OS 150 has faulted.

If fault response agent 135 determines in decision block 345 that the system error has occurred, fault response agent responds to the system error based upon fault tolerance policy 140 (process block 355). In one embodiment, fault tolerance policy 140 contains a list of policy directives corresponding to system errors. Fault response agent 135 executes these policy directives to respond to the detected system error. For example, one such policy directive may be to reset processing system 100. In this case, processing system 100 would return to process block 305 and proceed from there as discussed above. Other policy directives may included terminating execution of one or more of software applications 155 that are the source of the system error, restoring a saved basic input output system image to NV storage unit 130, or restoring a saved software image (e.g., system files of OS 150) to a hard disk (not shown) coupled to CPU 105. In one embodiment, fault response agent 135 maintains a log of detected system errors. In this embodiment, if fault response agent 135 logs the same system error several times (e.g., four times in one week), fault response agent 135 may determine, based upon fault tolerance policy 140 and the log containing repetitious system errors, that a prudent policy directive is to restore the saved software image or the saved BIOS image to the hard disk or NV storage unit 130, respectively.

Returning to decision block 345, if fault response agent 135 determines no system error has occurred, processing system 100 deactivates the protected mode of operation (process block 350) and CPU 105 resumes execution from where it left off in the OS runtime mode of operation (process block 325). In one embodiment, this loop between OS runtime mode of operation and the protected mode of operation continues indefinitely. Furthermore, in one embodiment, applications 155 and OS 150 resume execution without knowledge they were ever suspended. This transparency of the protected mode of operation may be accomplished by saving state parameters of CPU 105 just prior to activating the protected mode of operation. After deactivating the protected mode of operation, the saved state parameters are copied back to CPU 105 and the OS runtime mode of operation resumes.

Figure 4:
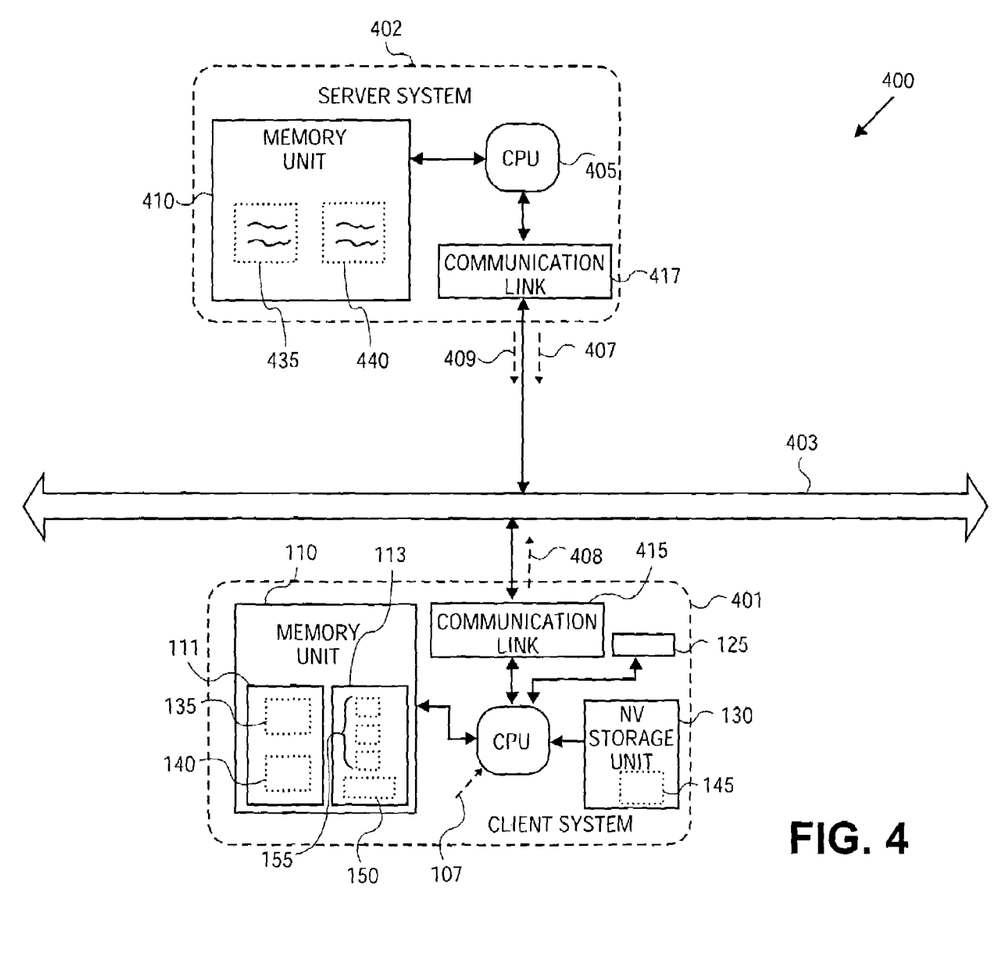
FIG. 4 is a block diagram illustrating a server-client system to execute a policy-based response to system errors over a network, in accordance with an embodiment of the present invention.

FIG. 4 is a block diagram illustrating an embodiment of a server-client system 400 to execute a policy-based response to system errors over a network 403, according to an embodiment of the present invention. In this embodiment, server-client system 400 includes a client system 401 communicatively coupled to a server system 402 via a network 403. The illustrated embodiment of client system 401 includes CPU 105, memory unit 110, a communication link 415, memory location 125, and NV storage unit 130. The illustrated embodiment of server system 402 includes CPU 405, memory unit 410, and a communication link 417. In one embodiment, memory unit 410 includes a policy agent 435 and a fault tolerance policy 440.

In one embodiment, client system 401 is similar to processing system 100, but with added functionality to communicate over network 403 with server system 402. Communication link 415 couples CPU 105 of client system 401 to network 403. Similarly, communication link 417 couples CPU 405 of server system 402 to network 403. Communication links 415 and 417 may be any devices capable of connecting to and communicating over a network. In one embodiment, communication links 415 and 417 are network interface cards. Embodiments of network 403 include a local area network, a wide area network, the Internet, or the like.

Figure 5:
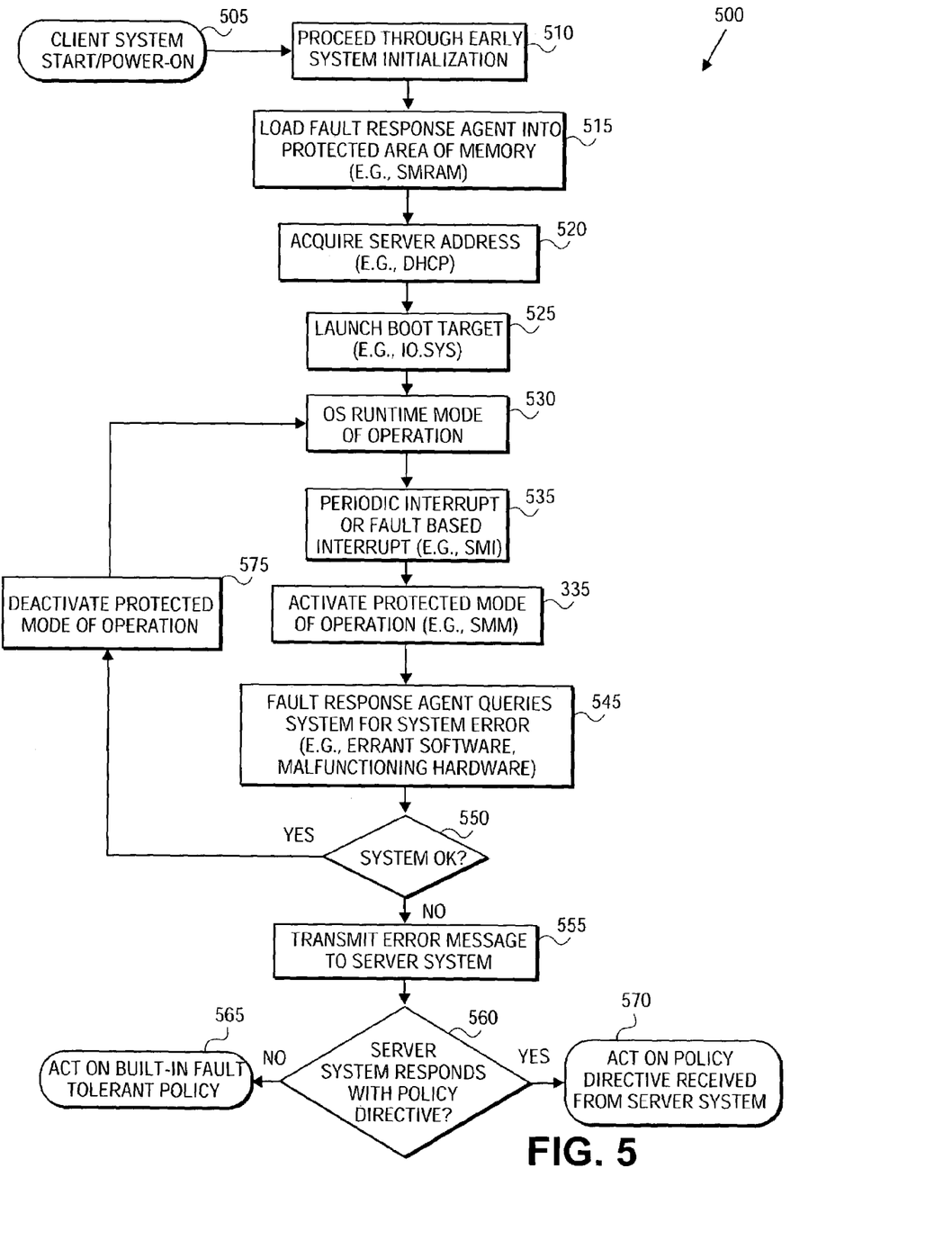
FIG. 5 is a flow diagram illustrating a method to implement a client system to execute a policy-based response to system errors over a network, in accordance with an embodiment of the present invention.

Turning now to FIGS. 4 and 5, one embodiment of client system 401 operates as illustrated by a process 500 to implement a policy-based response to system errors over network 403, according to an embodiment of the present invention. Embodiments of client system 401 operate similarly to embodiments of processing system 100, with the exceptions discussed below.

In a process block 505, client system 401 is powered-on. Thereafter, client system 401 proceeds through early system initialization (process block 510) and loads fault response agent 145 into protected area 111 of memory unit 110 (process block 515). In a process block 520, client system 401 acquires a server address of server system 402. In one embodiment, client system 401 broadcasts a DHCP call to obtain the server address of server system 402 on network 403 to effect future communications with server system 402. It should be appreciated that client system 401 may use other network protocols to effect communications over network 403 with server system 402, and further that the timing of the DHCP call may occur before or after the illustrated placement of process block 520 in process 500. In a process block 525, client system 401 launches a boot target of OS 150. Once OS 150 takes control of CPU 105, client system 401 enters into the OS runtime mode of operation (process block 530).

In a process block 535, CPU 105 receives an interrupt signal indicating that the protected mode of operation should be activated. In one embodiment, CPU 105 receives interrupt signal 107 to indicate that the protected mode of operation should be activated. In one embodiment, CPU 105 receives an interrupt signal 407 transmitted from server system 402 indicating that client system 401 is to activate the protected mode of operation. In one embodiment, interrupt signal 407 is a data packet transmitted over network 403 that triggers a wake-on-LAN functionality of communication link 415. In this wake-on-LAN embodiment, communication link 415 indicates to CPU 105 to activate the protected mode of operation in response to receiving interrupt signal 407 via network 403.

Once client system 401 is operating in the protected mode of operation, fault response agent 135 queries client system 401 to determine if a system error has occurred (process block 545). The querying of client system 401 is similar to that described above in connection with processing system 100 as are the type of system errors that may occur. If fault response agent 135 determines a system error has occurred (decision block 550), fault response agent 135 generates an error message 408 containing data descriptive of the particular system error and transmits error message 408 to server system 402 (process block 555) via communication link 415 and network 403.

After transmitting error message 408, fault response agent 135 waits a predetermined period of time to receive a policy directive 409 from server system 402. If policy directive 409 is received by client system 401 (decision block 560), fault response agent 135 parses policy directive 409 (process block 570) and executes instructions contained within policy directive 409. In one embodiment, policy directive 409 includes a simple reset instruction. In one embodiment, policy directive 409 includes an instruction indicating that a new software image is being sent over network 403 from server system 402, that client system 401 is to receive this new software image, and that client system 401 is to install this new software image in an appropriate location of client system 401. In one embodiment, this new software image contains uncorrupted files of OS 150 to replace corrupted files of OS 150. In one embodiment, policy directive 409 includes an instruction indicating that a new BIOS image is being sent over network 403 from server system 402, that client system 401 is to receive this new BIOS image and that client system 401 is to install this new BIOS image in an appropriate location of client system 401. In one embodiment, policy directive 409 includes instructions for fault response agent 135 to respond to the system error based on its built-in fault tolerance policy 140. It should be appreciated that policy directive 409 may include all or some of the above instructions as well as others.

In one embodiment, if after waiting a predetermined period of time, fault response agent 135 fails to receive policy directive 409 from server system 402, fault response agent 135 acts to respond to the detected system error based on the particular system error and fault tolerance policy 140 stored on client system 401 (process block 565). In other words, if fault response agent 135 fails to receive instruction on how to respond to the particular system error from server system 402, fault response agent 135 will take its own measures to remedy the system error based on its own built-in fault tolerance policy 140.

Returning to decision block 550, if fault response agent 135 fails to detect a system error, client system 401 will deactivate the protected mode of operation (process block 575) and return to the OS runtime mode of operation (process block 530). This loop of activating and deactivating the protected mode of operation may continue indefinitely while client system 401 is powered-on. Furthermore, the frequency of activating the protected mode of operation may be based upon a fixed duration of time (e.g., every 10 seconds, every 1 second, etc.), activated based on a hardware interrupt as described above, activated based on a software interrupt, or all or some of these in combination.

Figure 6:
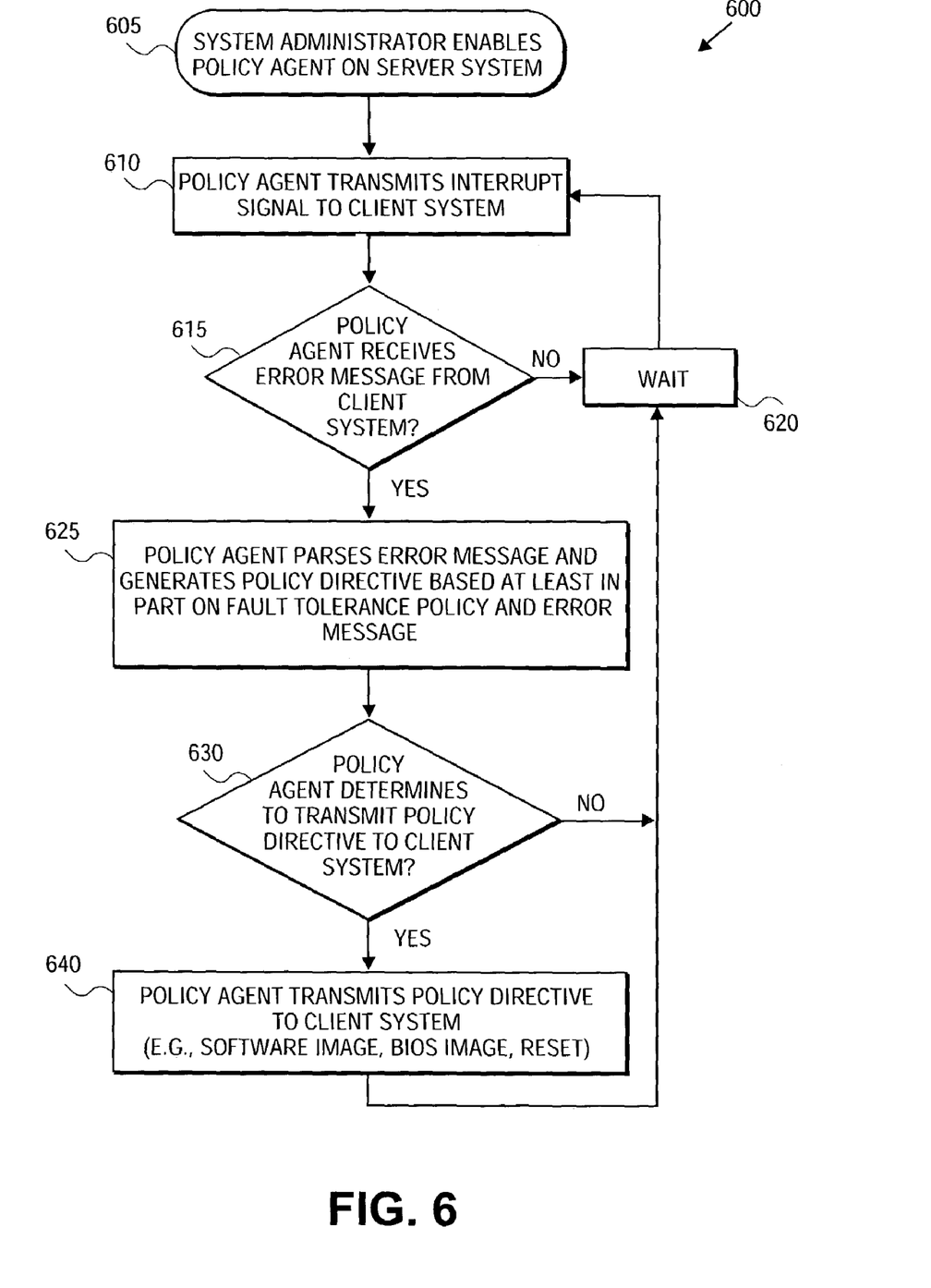
FIG. 6 is a flow diagram illustrating a method to implement a server system to execute a policy-based response to system errors over a network, in accordance with an embodiment of the present invention.

Turning now to FIGS. 4 and 6, one embodiment of server system 402 operates as illustrated by a process 600 to implement a policy-based response to system errors over network 403, according to an embodiment of the present invention.

In a process block 605, a system administrator or user of server system 402 enables policy agent 435 running on server system 402. In one embodiment, policy agent 435 is a software application executed by CPU 405 and stored in memory unit 410. In one embodiment, memory unit 410 is system RAM.

In a process block 610 policy agent 435 transmit interrupt signal 407 over network 403 to indicate to client system 401 to activate the protected mode of operation. Policy agent 435 may generate and transmit interrupt signal 407 periodically, randomly, in response to unusual network traffic on network 403 or the lack of network traffic on network 403 originating from client system 401, at predetermined times of a day or week (e.g., during off-peak usage hours of network 403), or at the direction of the user of server system 402. It should be appreciated that in other embodiments of process 600, process block 610 is skipped as client system 401 may be capable itself of activating the protected mode of operation without receiving interrupt signal 407.

In a decision block 615, policy agent 435 may or may not receive error message 408 from client system 401. If client system 401 detects a system error after activating the protected mode of operation and transmits error message 408 over network 403, policy agent 435 parses error message 408 to generate policy directive 409 based on fault tolerance policy 440 (process block 625). In one embodiment, fault tolerance policy 440 contains a list of policy directives (e.g., remedial instructions) corresponding to types of system errors. Thus, when policy agent 435 receives and parses error message 408, policy agent 435 generates policy directive 409 containing remedial instructions for client system 401 with reference to fault tolerance policy 440. In one embodiment, when policy agent 435 generates policy directive 409, it considers other factors as well as the particular system error reported by client system 401. For instance, policy agent 435 may consider network traffic of network 403 when deciding what type of remedial instruction to send. During high network traffic periods, policy agent 435 may decline to initiate transfers of new software or BIOS images and instead transmit a short policy directive 409, such as a reset instruction. Another factor policy agent 435 may consider is a log file containing records of error messages 408 sent by client system 401. If policy agent 435 determines that client system 401 has sent an unusual large number of error messages 408 (e.g., five in one week) fault tolerance policy 440 may indicate to policy agent 435 that a new software image and/or BIOS image should be uploaded to client system 401.

In one embodiment, in response to receiving error message 408 from client system 401, policy agent 435 may transmit one or more query instructions to fault response agent 140 on client system 401 to gather more information regarding the system error detected by fault response agent 135. In this embodiment, error message 408 may only represent an indication that fault response agent 135 has detected a system error in client system 401, but contain no information regarding the type of system error. After gathering more diagnostic information with the above described query instructions, policy agent 435 may use this diagnostic information along with fault tolerance policy 440 to generate policy directive 409.

In a decision block 630, policy agent 435 determines whether or not to transmit policy directive 409. If policy agent 435 determines to transmit policy directive 409, it is transmitted in a process block 640, and then policy agent 435 waits a predetermined period of time, in a process block 620, before broadcasting another interrupt signal 407 over network 403 to client system 401 in process block 610. As stated above, if the particular policy directive 409 is to upload a new software or BIOS image to client system 401 and network traffic is currently high, policy agent 435 may decline to transmit the particular policy directive 409 at the current time. Instead, policy agent 435 may cue the particular policy directive 409 to send at a later time when network traffic is lower. In this case, client system 401 will fail to receive policy directive 409 in an allotted period of time and fault response agent 135 on client system 401 will act on its own built-in fault tolerance policy 140. If policy agent 435 determines not to transmit policy directive 409 in decision block 630, policy agent 435 waits a predetermined period of time in process block 620 before transmitting another interrupt signal 407.

Returning to decision block 615, if after transmitting interrupt signal 407, policy agent 435 fails to receive error message 408 after waiting a suitable period of time, policy agent 435 assumes client system 401 has no system error to report. In this case, policy agent 435 waits a predetermined period of time (process block 620) before transmitting another interrupt signal 407. This loop of waiting, then transmitting interrupt signal 407, can continue indefinitely as long as policy agent 435 is activated on server system 402. In this manner, system errors or faults occurring on client system 401 coupled to network 403 may be remedied without need of human intervention and with minimal client system 401 downtime.

It should be appreciated that although only one client system 401 is illustrated as coupled to network 403, any number of client systems 401 may be coupled to network 403. Furthermore, server system 402 can be configured to service and maintain many client systems 401 in the manner described above.

Figure 7:
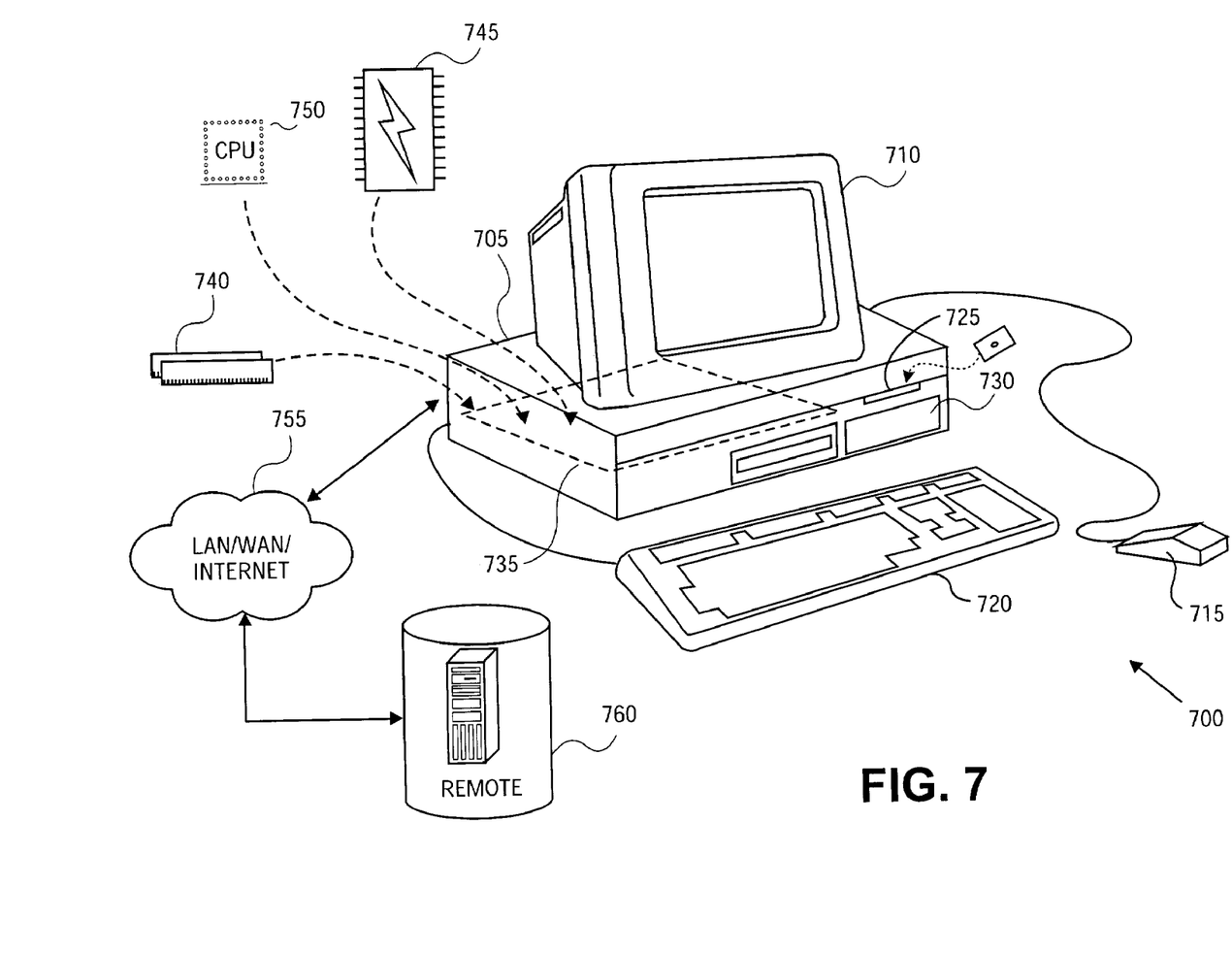
FIG. 7 illustrates an exemplary computer system to implement a processing system, a client system, or a server system to execute a policy-based response to system errors, in accordance with an embodiment of the present invention.

FIG. 7 illustrates an exemplary embodiment of a computer system 700 to implement processing system 100, client system 401, or server system 402, in accordance with the teachings of the present invention. Computer system 700 includes a chassis 705, a monitor 710, a mouse 715 (or other pointing device), and a keyboard 720. The illustrated embodiment of chassis 705 further includes a floppy disk drive 725, a hard disk 730, a power supply (not shown), and a motherboard 735 populated with appropriate integrated circuits including system RAM 740, non-volatile memory 745, and one or more CPUs 750.

In one embodiment, a network interface card ("NIC") (not shown) is coupled to an expansion slot (not shown) of motherboard 735. The NIC is for connecting computer system 700 to a computer network 755, such as a local area network, wide area network, or the Internet. In one embodiment network 755 is further coupled to a remote computer 760, such that computer system 700 and remote computer 760 can communicate.

Hard disk 730 may comprise a single unit, or multiple units, and may optionally reside outside of computer system 700. Monitor 710 is included for displaying graphics and text generated by software programs and program modules that are run by computer system 700. Mouse 715 (or other pointing device) may be connected to a serial port, USB port, or other like bus port communicatively coupled to CPU(s) 750. Keyboard 720 is communicatively coupled to motherboard 735 in a similar manner as mouse 715 for user entry of text and commands.

In one embodiment, non-volatile memory 745 is NV storage unit 130 for storing fault response agent 145. In one embodiment, RAM 740 is memory unit 110 having protected area 111 and non-protected area 113.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   receiving an interrupt signal via a network external to a processing system;
   activating a system management mode of operation (SMM) in the processing system in response to the interrupt signal received via the network;
   querying a memory location containing data of the processing system during the SMM;
   determining whether the data has evolved overtime in a predetermined manner during an operating system runtime mode of operation of the processing system to determine whether a system error has occurred;
   sending an error message to a server system during the SMM, if the system error is determined to have occurred;
   responding to the system error based on a fault tolerance policy, if the system error is determined to have occurred; and
   deactivating the SMM, if the system error is determined not to have occurred.

2. The method of claim 1 wherein querying the processing system to determine whether the system error has occurred is accomplished by a fault response agent stored in a system management random access memory ("SMRAM") of the processing system.

3. The method of claim 1 wherein the interrupt signal is received periodically.

4. The method of claim 1, further comprising:
   receiving a policy directive from the server system during the SMM, the policy directive derived from the fault tolerance policy and the error message, wherein responding to the system error based on the fault tolerance policy comprises responding to the system error based on the policy directive, if the system error is determined to have occurred.

5. The method of claim 4, wherein the policy directive includes at least one of an instruction to load a software image, an instruction to load a basic input output system image, or a reset instruction.

6. The method of claim 1, further comprising responding to the determined system error by executing at least one of restoring a saved software image, restoring a saved basic input output image, or resetting the processing system based on the fault tolerance policy and the determined system error.

7. A computer-readable medium having instructions embodied thereon, the instructions to be executed by a machine to perform:
   receiving an interrupt signal via a network external to a processing system;
   activating a system management mode of operation (SMM) in the processing system in response to the interrupt signal received via the network;
   querying a memory location containing data of the processing system during the SMM;
   determining whether the data has evolved overtime in a predetermined manner during an operating system runtime mode of operation of the processing system to determine whether a system error has occurred;
   sending an error message to a server system during the SMM, if the system error is determined to have occurred; and
   responding to the system error based on a fault tolerance policy, if the system error is determined to have occurred.

8. The computer-readable medium of claim 7, further having instructions to perform deactivating the SMM and activating an operating system runtime mode of operation, if the system error is determined not to have occurred.

9. The computer-readable medium of claim 7 wherein querying the memory location of the processing system and responding to the system error is accomplished by a fault response agent executed from a system management random access memory ("SMRAM") of the processing system to protect the fault response agent from corruption during an operating system runtime mode of operation of the processing system.

10. The computer-readable medium of claim 7, further having instructions to perform:
    sending an error message to a server system communicatively coupled to the processing system, if the system error is determined to have occurred; and
    receiving a policy directive from the server system, the policy directive derived at least in part from the fault tolerance policy and the error message.

11. The computer-readable medium of claim 10 wherein the policy directive includes at least one of an instruction to load a software image, an instruction to load a basic input output system image, or a reset instruction.

12. The computer-readable medium of claim 7, further having instructions to perform receiving a policy directive from the server system during the SMM, the policy directive derived from the fault tolerance policy and the error message, wherein responding to the system error based on the fault tolerance policy comprises responding to the system error based on the policy directive, if the system error is determined to have occurred.

13. A client system, comprising:
    a central processing unit ("CPU") to execute instructions in both a system management mode of operation (SMM) and an operating system ("OS") runtime mode of operation;
    a communication link to communicatively couple the CPU to a network external to the client system; and
    a nonvolatile storage unit communicatively coupled to the CPU and storing a fault response agent, the fault response agent to be executed by the CPU during the SMM, the fault response agent to detect a system error occurring during the OS runtime mode of operation by querying a memory location of the client system containing data to determine if the data has evolved overtime in a predetermined manner during the OS runtime mode of operation and to respond to the system error based upon a fault tolerance policy, wherein the fault response agent is configured to transmit an error message to a server system via the communication link during the SMM if the fault response agent detects the system error, wherein the SMM is activated in response to an interrupt signal received via the network.

14. The client system of claim 13, further comprising a memory unit communicatively coupled to the CPU, the memory unit having a protected area, the fault response agent to load into the protected area to prevent corruption of the fault response agent during the OS runtime mode of operation.

15. The client system of claim 13 wherein the fault tolerance policy is stored on the server system and wherein the fault response agent is configured to receive a policy directive from the server system, the policy directive derived at least in part from the fault tolerance policy and the error message.

16. The client system of claim 15 wherein the policy directive includes at least one of an instruction to load a software image, an instruction to load a basic input output system image, or a reset instruction.

17. The client system of claim 13 wherein the fault response agent executes at least one of restoring a saved software image, restoring a saved basic input output image, or resetting the client system based at least in part on the system error and the fault tolerance policy, if the fault response agent fails to receive a policy directive from the server system.

18. The client system of claim 13 wherein the SMM is activated periodically.

19. The client system of claim 13, wherein the fault response agent is further configured to receive a policy directive from the server system during the SMM, the policy directive derived from the fault tolerance policy and the error message, wherein the fault response agent responds the system error based on the policy directive, if the system error is determined to have occurred.

20. A computer-readable medium having instructions embodied thereon, the instructions to be executed by a machine to perform:

activating a system management mode of operation (SMM) in a processing system;

querying the processing system during the SMM to determine whether a system error has occurred;

sending an error message to a server system during the SMM, if the system error is determined to have occurred;

receiving a policy directive during the SMM, derived at least in part from a fault tolerance policy and the error message, from the server system, if the system error is determined to have occurred; and responding to the system error based on the policy directive, if the system error is determined to have occurred.

21. The computer-readable medium of claim 20, further having instructions to perform deactivating the SMM and activating an operating system runtime mode of operation, if the system error is determined not to have occurred.

22. The computer-readable medium of claim 21 wherein the SMM is activated periodically.

23. The computer-readable medium of claim 21 wherein the SMM is activated in response to an interrupt signal received via a network.

24. The computer-readable medium of claim 21 wherein querying the processing system and responding to the system error is accomplished by a fault response agent executed from a system management random access memory ("SM-RAM") of the processing system to protect the fault response agent from corruption during an operating system runtime mode of operation of the processing system.

25. The computer-readable medium of claim 21 wherein querying the processing system by the fault response agent comprises querying a memory location containing data of the processing system to determine if the data has evolved over time in a predetermined manner during an operating system runtime of the processing system.

26. The computer-readable medium of claim 21 wherein the policy directive includes at least one of an instruction to load a software image, an instruction to load a basic input output system image, or a reset instruction.

* * * * *